July 22, 1952  E. S. CLEAVE ET AL  2,604,015
MULTIPLE BREECH CLOSING
Filed Nov. 2, 1949
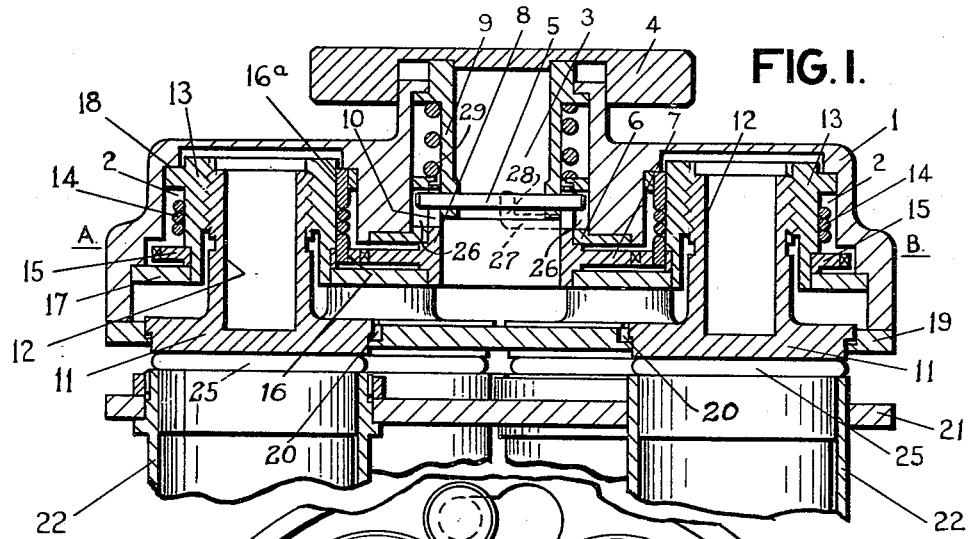
FIG. I.
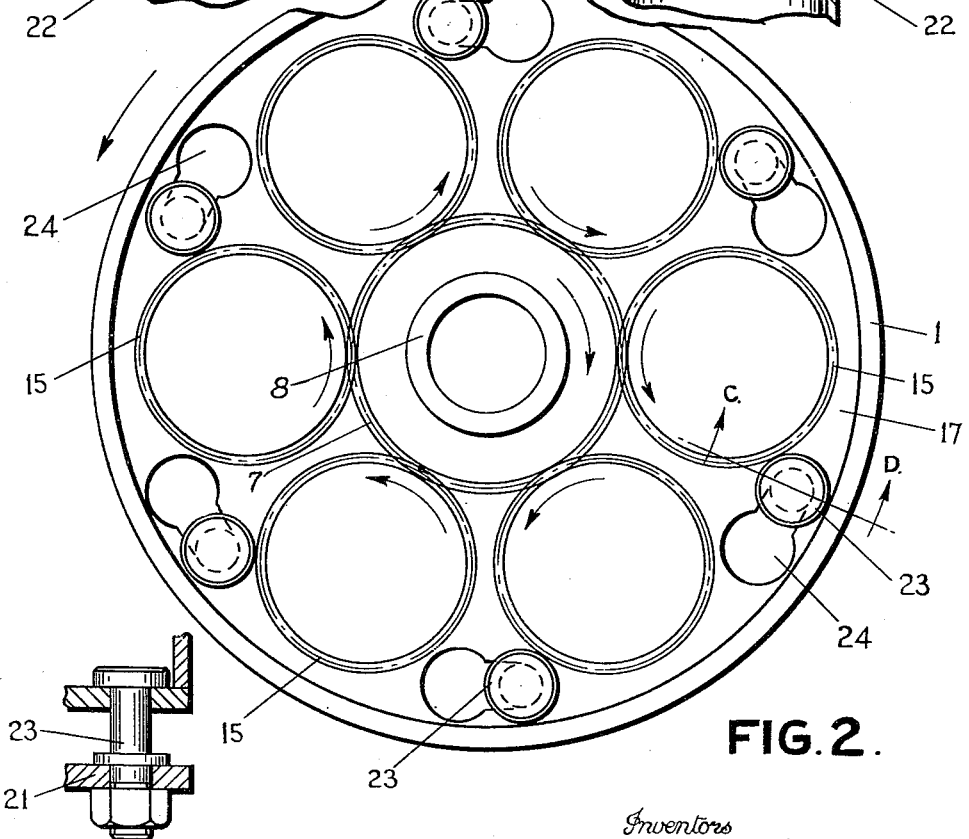
FIG. 2.
FIG. 3.
Inventors
Edgar Sherville Cleave
David Roy Trowbridge
By William E. P. Bayly
Attorney.

Patented July 22, 1952

2,604,015

UNITED STATES PATENT OFFICE 2,604,015

MULTIPLE BREECH CLOSING

Edgar Sherville Cleave, Chigwell, and David Roy Trowbridge, Emerson Park, Hornchurch, England, assignors to The Plessey Company Limited, Ilford, England, a British company Application November 2, 1949, Serial No. 125,122
In Great Britain November 4, 1948

9 Claims. (Cl. 89—17)

This invention relates to multi-breech mechanisms.

In multi-breech mechanisms it has been found that there are occasions when one or more of the breeches are not gas tight when in the loaded position. It has been discovered that this defect has been caused by heads of cartridges not being of a uniform thickness.

The conventional way of sealing a multi-breech mechanism is to close the breeches simultaneously. In the event of any one of the breeches containing a cartridge whose head is of a greater thickness than the others, the movement of the whole breech mechanism is arrested as soon as said mechanism abuts against the said cartridge, with the result that only one breech is sealed.

It is an object of this invention to provide a simple mechanism whereby all the breeches can be sealed irrespective of the varying thickness of the heads of cartridges.

With these and other objects in view the invention will now be described with reference to the accompanying drawings, in which—

Fig. 1 is a sectional elevation of a breech mechanism head for a six chambered cartridge breech.

Fig. 2 is a plan of the gearing on line A—B of Fig. 1, and

Fig. 3 is a detail of the breech head locking mechanism on line C—D of Fig. 2.

According to the invention the multi-breech mechanism has the combination of a breech head, a control mechanism mounted in said breech head for imparting a rotary drive, at least two sealing pads moving axially in said breech body, a lost motion mechanism associated with each sealing pad operatively connected to the control mechanism, said control mechanism transmitting a rotary drive to the lost motion mechanism and said lost motion mechanism imparting an axial movement to the sealing pads to seal the breeches irrespective of any irregularities in thickness of the heads of cartridges.

Referring to the drawings:

A metal block or casting serving as the breech head 1 is formed with six radially disposed cavities 2 and a center opening 3.

A spring loaded control handle 4 is rotatably mounted in the center opening 3. Said handle 4 is fitted with a transverse pin 5 which moves in a slotted guide ring 6 fixed to the breech head 1.

A gear wheel 7 provided with a hub 8 is rotatably mounted between the hub 9 integral with control handle 4 and guide ring 6. The gear hub 8 has diametrically opposed slots 10 to enable the ends of the transverse pin 5 to project in to the slotted guide ring 6 whereby the control handle can move longitudinally and radially to rotate the gear wheel 7 in either direction.

Housed in each cavity 2 is a metal sealing pad 11 having a rearwardly extending hollow shank 12. The outer end of shank 12 is externally threaded for the purpose hereinafter set forth.

A nut 13 is screwed on to the threaded portion of the hollow shank 12. Said nut 13 carries a helical spring 14 and a rotatable ring gear 15 which is anchored to the nut 13 by means of the ends of the spring 14 being bent out longitudinally and inserted into slots 16, 16a in the nut 13, and ring gear 15 respectively. The assembly on each nut 13 is held in position by a retaining plate 17 secured inside the breech head 1. The nuts 13 are free to rotate but are prevented from moving axially by abutting against a shoulder 18 in each cavity 2 and retaining plate 17. The ring gears 15 each mesh with the gear wheel 7 as shown in Fig. 2.

A cover plate 19 is secured to the base of the breech head 1; said cover plate 9 being provided with six circumferential openings to receive the sealing pads 11. Each sealing pad 11 and corresponding opening in the cover plate 19 are connected together by keys 20 which permit the pads 10 to move axially but are prevented from rotating.

A barrel plate 21 fixed to the cartridge barrels 22 is provided with a number of studs 23 which engage in keyways 24 formed in the cover plate 19, whereby the breech head unit is removably fixed to the cartridge barrels 22. The annular space within the hollow shanks 12 behind the sealing pads 11 are for the purpose of accommodating a firing mechanism, which latter, may be a mechanical, electrical, or a combination of the two. As the firing mechanism does not form a part of the invention is shown.

In operation, the breech head 1 is placed over the end of the barrels 22 in such a manner that the studs 23 can pass into enlarged openings in the keyways 24 then imparting a slight rotary movement to the breech head 1 causing the studs 23 to slide in the slotted keyways 24, whereby the breech head 1 is locked to the barrels 22 with the sealing pads 11 in axial alignment with the heads of cartridges 25. The control handle 4 is first pressed inwards when the transverse pin 5 moves longitudinally in the slotted ring 6 and then turned. Simultaneously with this rotary movement, gear wheel 7 revolves and imparts a similar movement to all of the ring gears 15 in order to transmit rotary motion is transmitted to each nut 13 through the helical spring 14 to cause the sealing pads to move axially, as the nuts 13 are in threaded engagement with the shanks 12 of the pads 11. The nuts 13 cannot move longitudinally as herein set forth.

In the event of one cartridge having a thicker head than the remainder, the one with the thickest head will have all clearance taken up before the others. As all the ring gears 15 are connected to the gear 7 continued rotation of the control handle 4 seals all the cartridges. In the event of any discrepancy in the thickness of the cartridge heads, springs 14 are free to unwind after the pads 11 have closed and merely apply an increased load to each sealing pad 11. As soon as all the cartridge heads are sealed the transverse pin reaches the end of its movement, when on being released moves outwardly under the influence of its spring loading.

After discharge of one or more of the cartridges the breech head 1 is removed in a reverse manner to that herein described for fitting.

In order to provide for combined movement of the control handle 4 and the guide ring 6 as well as movement of the handle 4 and gear wheel 7 independently of the ring 6, the latter is provided with diametrically opposed vertically extending slots 26 for receiving opposite ends of the pin 5, as shown in Fig. 1. Thus initial rotation of the control member 4 rotates the entire breech head 1 to lock the same to the barrel plate 21. Thereafter, the member 4 is pushed inwardly and turned, this action being permitted by the provision of laterally extending slots in the ring 6, one of these slots being shown at 27 in Fig. 1. During such turning action of member 4, the latter is moved independently of the ring 6 until all of the cartridge heads have been sealed as heretofore stated. The pin 5 has then been moved to a position where the ends thereof are aligned with diametrically opposed vertically extending slots 28 in the ring 6, one of which is shown in Fig. 1. When this occurs, the member 4 is released whereupon the return spring 29 moves the member 4 outwardly and the opposite ends of the pin 5 are received in the slots 28. The circumferential extent of the slot 27 is approximately 120°, to allow for the movements heretofore stated.

The control handle in the foregoing description is for manual operation, but it is to be clearly understood that the invention is not limited to manual operation; any convenient form of mechanical or electrical or electro-mechanical means can be used.

We claim:

1. In a multi-breech mechanism having in combination a breech head, a control mechanism mounted in said breech head for imparting a rotary drive, at least two sealing pads movable axially in said breech head, a lost motion mechanism associated with each sealing pad and operatively connected to the control mechanism, said control mechanism transmitting rotary motion to the lost motion mechanism and said lost motion mechanism imparting an axial movement to the sealing pads to seal the breeches irrespective of any irregularities in thickness of the heads of cartridges.

2. In a multi-breech mechanism having in combination a breech head, a control mechanism mounted in said breech head for imparting a rotary drive, at least two sealing pads moving axially in said breech head, a lost motion mechanism associated with each sealing pad and operatively connected to the control mechanism, and means for locking the breech head to the breeches, said control mechanism transmitting rotary motion to the lost motion mechanism and said lost motion mechanism imparting an axial movement to the sealing pads to seal the breeches irrespective of any irregularities in thickness of the heads of cartridges.

3. In a multi-breech mechanism the combination of a breech head, having a central aperture and a plurality of circumferential cavities, a control member mounted in the central aperture of said breech head, means for providing limited axial and rotary movement of said control member, a control gear connected to said control member, a sealing pad in each cavity, a lost motion mechanism provided at the rear of each sealing pad, a ring gear operatively connected to each said lost motion mechanism and meshing with the control gear, and means for locking the breech head to the breeches, the assembly comprising the control gear, the lost motion mechanisms and the ring gears transmitting a rotary drive from the control handle into independent longitudinal movement of each sealing pad to seal the breeches.

4. In a multi-breech mechanism the combination of a breech head, having a central aperture and a plurality of circumferential cavities, a control member mounted in the central aperture of said breech head, means for providing limited axial and rotary movement of said control member, a central gear connected to said control member, a sealing pad with a hollow shank at the rear, a nut screwed on to the shank, a gear rotatably mounted on the nut, spring means connecting said gear to said nut for imparting rotary motion to said nut, one said sealing pad and assembly mounted in each radial cavity in the breech head, the gear of each assembly meshing with the control gear, a retaining plate secured in the breech head holding the sealing pad assemblies in position, a cover plate with a plurality of circumferential apertures secured to the base of the breech head, said sealing pads projecting through the apertures in said cover plate, and means for locking the breech head to the breech with the sealing pads in axial alignment with the cartridge barrels in said breech.

5. In a multi-breech mechanism having in combination a breech head removably fitted to a breech, said breech head having a central aperture and a plurality of circumferential cavities therein, a spring loaded control member mounted in the aperture of the breech head, means for providing a limited axial and rotary movement of said control member, a control gear connected to said control member, a sealing pad with a rearwardly extending hollow shank, a nut screwed on to the end of each hollow shank, a ring gear rotatably mounted in said nut, a helical spring mounted on each nut being connected to said nut and ring gear respectively, each sealing pad with its assembly mounted in a cavity in said breech head, a retaining plate fixed to the breech head for holding the assembly in position and preventing axial movement of the nuts, said ring gears in constant mesh with said control gear, a cover plate with radial apertures and keyways fixed to the base of said breech head, said sealing pads arranged in the radial apertures in said cover plate, keys arranged between said pads and cover plate to provide for axial movement of the pads and prevent rotary movement thereof, a barrel plate fixed to the cartridge barrels and radial studs fixed to said plate removably engaging with key ways in said cover plate.

6. In a multi-breech mechanism having a breech head, a multi-breech, and a plurality of sealing pads mounted in said head for axial movement, a rotary control device carried by said head, and means for moving said sealing pads axially with respect to said head to seal the breech head and breech irrespective of any irregularities in thickness of the heads of cartridges in the breech, comprising a rotatable member associated with each sealing pad for moving the latter axially upon rotation of the member, a lost motion mechanism connected with each member, for rotating the latter and means controlled by rotaary movement of said control device for moving all of said lost motion mechanisms.

7. In a multi-breech mechanism having a breech head, a multi-breech, and a plurality of sealing pads mounted in said head for axial movement, a rotary control device carried by said head, and means for moving said sealing pads axially with respect to said head to seal the breech head and breech irrespective of any irregularities in thickness of the heads of cartridges in the breech, comprising a spring associated with each sealing pad, and means controlled by rotary movement of said control device to deform said springs to effect axial movement of said sealing pads.

8. In a multi-breech mechanism having a breech head, a multi-breech, and a plurality of sealing pads mounted in said head for axial movement, a rotary control device carried by said head, and means for moving said sealing pads axially with respect to said head to seal the breech head and breech irrespective of any irregularities in thickness of the heads of cartridges in the breech, comprising a rotatable member associated with each sealing pad for moving the latter axially upon rotation of the member, means for connecting all of said rotatable members with said control device for rotation thereby, and a spring associated with each sealing pad and forming a part of each respective connecting means.

9. In a multi-breech mechanism having a breech head, a multi-breech, and a plurality of sealing pads mounted in said head for axial movement, a rotary control device carried by said head, and means for moving said sealing pads axially with respect to said head to seal the breech head and breech irrespective of any irregularities in thickness of the heads of cartridges in the breech, comprising a rotatable member threadedly connected with each sealing pad to move the latter axially upon rotation of said member, a coil spring surrounding each rotatable member and having one end thereof connected with its associated rotatable member, a gear associated with each member and connected to the other end of the respective coil spring, and gear means connected with said control device and meshing with all of said gears.

EDGAR SHERVILLE CLEAVE.
DAVID ROY TROWBRIDGE.

REFERENCES CITED

The following references are of record in the file of this patent:

UNITED STATES PATENTS

| Number | Name | Date |
| --- | --- | --- |
| 190,645 | Taylor | May 8, 1877 |

FOREIGN PATENTS

| Number | Country | Date |
| --- | --- | --- |
| 2,994 | Great Britain | of 1864 |